United States Patent
Nakatani (10) Patent No.: US 6,536,723 B1
(45) Date of Patent: Mar. 25, 2003

(54) TRIPOD WITH IMPROVED TELESCOPIC EXTENSION

(75) Inventor: Koichiro Nakatani, Tokyo (JP)

(73) Assignee: Nihon Nelbon Seiki Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/830,052

(22) PCT Filed: Oct. 14, 1999

(86) PCT No.: PCT/JP99/05664

§ 371 (c)(1),
(2), (4) Date: Apr. 20, 2001

(87) PCT Pub. No.: WO01/14785

PCT Pub. Date: Mar. 1, 2001

(30) Foreign Application Priority Data

Aug. 24, 1999 (JP) ............................................. 11-263308

(51) Int. Cl.[7] .............................................. F16M 11/00
(52) U.S. Cl. .................................. 248/163.1; 248/188.5
(58) Field of Search .............................. 248/163.1, 167, 248/168, 170, 188.5; 52/160, 343, 901, 138, 120

(56) References Cited

U.S. PATENT DOCUMENTS

| 3,589,757 A | * | 6/1971 | Mooney | 287/58 |
| 3,741,509 A | * | 6/1973 | Kelly | 248/171 |
| 4,029,279 A | * | 6/1977 | Nakatani | 248/188.5 |
| 4,185,936 A | * | 1/1980 | Takahashi | 403/104 |
| 4,438,896 A | * | 3/1984 | Hall | 248/523 |
| 4,453,686 A | * | 6/1984 | INa | 248/168 |
| 4,761,092 A | * | 8/1988 | Nakatani | 403/104 |
| 6,152,638 A | * | 11/2000 | Lindsay | 403/109.5 |

FOREIGN PATENT DOCUMENTS

| DE | 3148391 | * | 6/1983 |
| GB | 2058557 | * | 4/1981 |
| GB | 2172528 | * | 9/1986 |
| JP | 05-094599 | * | 12/1993 |
| JP | 06-241387 | * | 8/1994 |
| JP | 07-025744 | * | 5/1995 |
| JP | 08-100883 | * | 4/1996 |

* cited by examiner

*Primary Examiner*—Ramon O Ramirez
*Assistant Examiner*—Kofi Schulterbrandt
(74) *Attorney, Agent, or Firm*—Darby & Darby (57) ABSTRACT

The invention includes a base (21) provided with pairs of fitting hole (25), two each of which are spaced apart and situated facing each other so as to constitute a pair. A pair of rotary shaft portions (28) of each first leg member (27) are rotatably fitted in each pair of fitting holes (25). The two rotary shaft portions (28) are formed on the outer surface of the upper end portion of each first leg member (27) as an integral body therewith so as to extend coaxially. A second leg member (29) is inserted in each first leg member (27) in such a way that the distance by which the second leg member (29) projects from the first leg member (27) can be adjusted. As the top end face of each second leg member (29) can be positioned flush with the top end face of the associated first leg member (27), the invention is capable of improving the telescopic extension ratio of the legs.

4 Claims, 6 Drawing Sheets

TRIPOD WITH IMPROVED TELESCOPIC EXTENSION

TECHNICAL FIELD

The present invention relates to a tripod and is particularly intended for a tripod which is capable of improving the telescopic extension ratio of its legs.

BACKGROUND OF THE INVENTION

Widely known examples of conventional tripods include a tripod having a structure shown in FIGS. 7 through 10.

The aforementioned conventional tripod has a leg structure comprising extensible legs, each of which may consist of three segments. The tripod has a base 2 having pairs of fitting holes 1. Two each fitting holes 1 are spaced apart and face towards each other so as to constitute a pair. A rotary shaft portion 4 at the upper end portion of each first leg member 3 is rotatably fitted in each fitting hole 1. A second leg member 6 is inserted in the first leg member 3 in such a way that the distance by which the second leg member 6 projects from the first leg member 3 can be adjusted, and a third leg member 7 is inserted in the second leg member 6 in such a way that the distance by which the third leg member 7 projects from the second leg member 6 can be adjusted.

Figure 8:
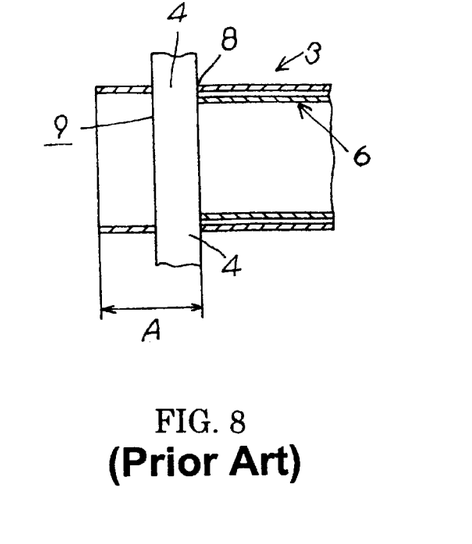
FIG. 8 is a sectional view of a leg portion of said conventional tripod.

The aforementioned two rotary shaft portions 4 of the first leg member 3 are formed of the two opposing ends of the shank of a bolt 9 inserted through a bolt insertion hole 8, which is formed at the upper end portion of the first leg member 3.

Figure 9:
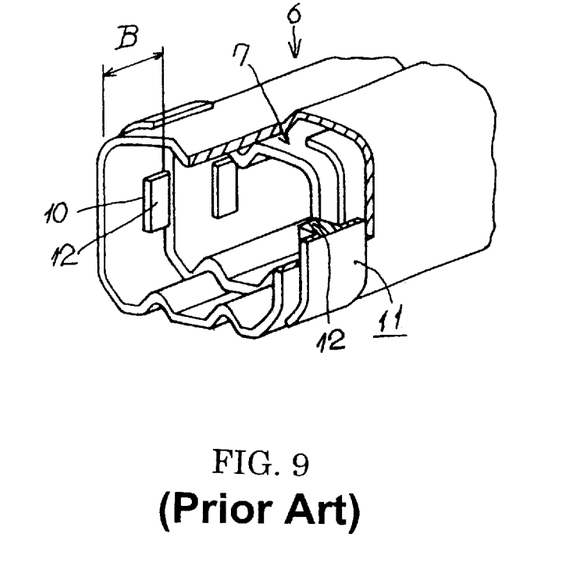
FIG. 9 is a perspective of said leg portion of the conventional tripod.

Penetration holes 10 are formed near the top of the aforementioned second leg member 6, and catching members 11 which have securing protrusions 12 are secured on the outer surface of the upper end portion of the second leg member 6, with their securing protrusions 12 respectively fitted in said penetration holes 10. In the state where the second leg member 6 projects from the first leg member 3 at the maximum extension, the catching members 11 are engaged with a receiving member 15, which is fixed in the bottom of the first leg member 3, so that the second leg member 6 is prevented from unintentionally slipping off of the first leg member 3.

Figure 10:
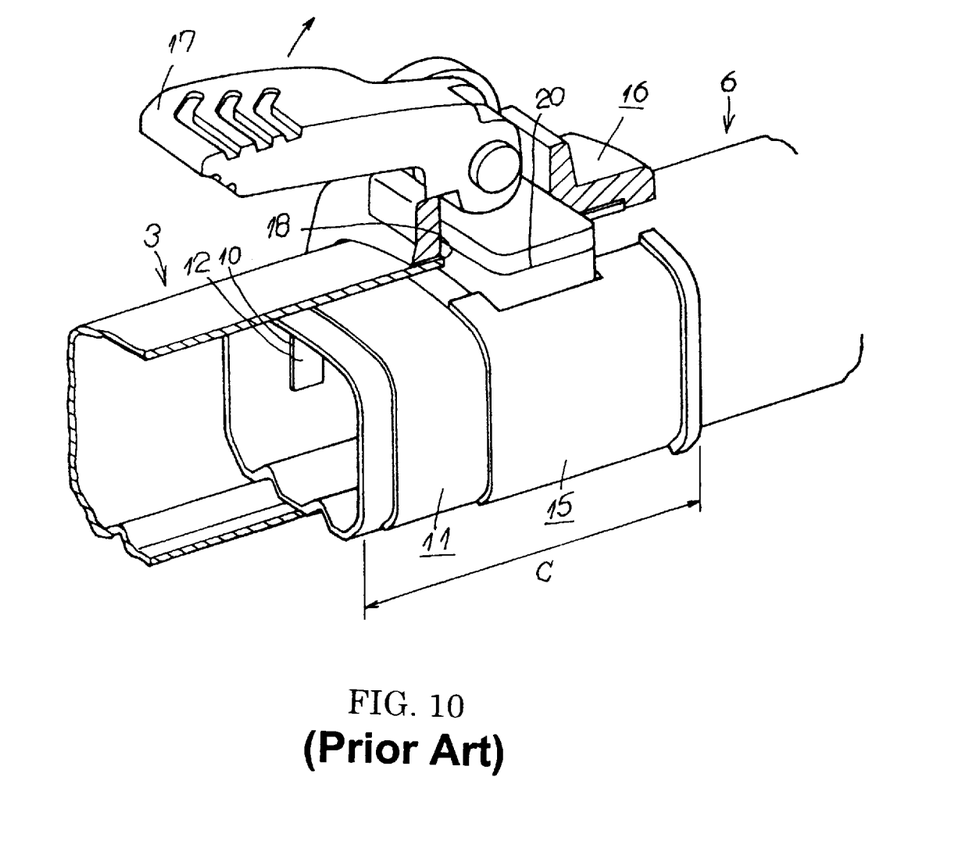
FIG. 10 is a perspective of said leg portion of the conventional tripod when it is carried.

An operation lever supporting member 16 is attached to the outer cylindrical surface of the lower end of the first leg member 3 so that an operation lever 17 is supported by the operation lever supporting member 16. The first leg member 3 is also provided with a brake insertion hole 18, which is formed near the bottom of the first leg member 3. A brake 20 is inserted through said brake insertion hole 18. When the brake 20 is in the state that it is inserted through the brake insertion hole 18, operation of the aforementioned operation lever 17 causes the brake 20 to be pressed against a location lower than the bottom of the catching members 11 of the second leg member 6, thereby securing the second leg member 6 to the first leg member 3.

However, as the telescopic extension ratio of the conventionally structured tripod described above is small, it presents problems in that attempting to make the tripod compact when carried results in insufficient height when in use, while trying to ensure a sufficient height when in use prevents the tripod from being made sufficiently compact when carried.

To be more specific, the rotary shaft portions 4,4 of each first leg member 3 of a tripod having the conventional structure described above are formed of the two ends of the shank of the bolt 9 inserted through the bolt insertion hole 8. Therefore, when the distance by which the second leg member 6 projects from the first leg member 3 is at its minimum extension, the top of the second leg member 6 abuts against the bolt 9. In other words, the extent of contraction when the tripod is carried is reduced by the dimension equivalent to the distance A shown in FIG. 8.

The securing protrusions 12 of the catching members 11 of each second leg member 6 are formed so as to have a relatively long protruding distance. Therefore, when the distance by which the third leg member 7 projects from the second leg member 6 is at its minimum extension, the top of the third leg member 7 abuts against the securing protrusions 12, which protrude from the inner surface of the second leg member 6. In other words, the extent of contraction when the tripod is carried is reduced by the dimension equivalent to the distance B shown in FIG. 9.

Furthermore, the conventional tripod presents a problem also when securing a second leg member 6 to the associated first leg member 3 before using the tripod; when the operation lever 17 of the first leg member 3 is operated in the state where the second leg member 6 projects from the first leg member 3 to its fullest extent, the brake 20 is pressed against a location lower than the bottom of the catching members 11 of the second leg member 6. Therefore, because of the length C of the portion where the first leg member 3 overlaps the second leg member 6 as shown in FIG. 10, an excessively long overlap has to be allowed, which may make it difficult to ensure an appropriate height when the tripod is used.

In order to solve the above problems, an object of the present invention is to provide a tripod which allows for an improved telescopic extension ratio and, therefore, can be made sufficiently compact when carried and ensure a sufficient height when in use.

DISCLOSURE OF THE INVENTION

A tripod according to the present invention includes a base having pairs of fitting holes, two each of which are spaced apart and situated facing each other so as to constitute a pair; first leg members, each of which has a pair of coaxially extending rotary shaft portions that are integrally formed on the outer circumferential surface of the upper end portion of the first leg member and rotatably fitted in the corresponding pair of fitting holes; and second leg members respectively inserted in said first leg members so that the distance by which each second leg member projects from the associated first leg member can be adjusted and that the top end face of each second leg member is flush with the top end face of the associated first leg member when the distance by which the second leg member projects from the first leg member is at its minimum extension. With the configuration as above, as a pair of coaxially extending rotary shaft portions are integrally formed on the outer surface of the upper end portion of each first leg member, the top end face of each second leg member is flush with the top end face of the associated first leg member when the distance by which the second leg member projects from the first leg member is at its minimum extension, the embodiment is capable of improving the telescopic extension ratio and ensures the tripod to be sufficiently compact when carried and have an appropriate height when in use.

A tripod according to another feature of the present invention includes a base; first leg members rotatably attached to said base; second leg members respectively inserted in said first leg members so that the distance by which each second leg member projects from the associated first leg member can be adjusted, each second leg member having penetration holes formed near the top of the second leg member; third leg members respectively inserted in said second leg members so that the distance by which each third leg member projects from the associated second leg member can be adjusted; receiving members respectively fixed in the bottoms of said first leg base members; and catching members disposed on the outer circumferential surface of the upper end portion of each second leg member, each catching member having an acting base portion and a securing protrusion formed on the inner surface of the acting base portion and fitted in the corresponding penetration hole, said acting base portion adapted to catch the corresponding receiving member when the second leg member is projected from the associated first leg member to the fullest extent, and said securing protrusion portion protruding from the inner surface of the acting base by a distance such that there is no possibility of the securing protrusion abutting against the top of the third leg member that is inserted in the second leg member. With the configuration as above, as the securing protrusions of the catching members of each second leg member are formed such that the protruding distance of the securing protrusions is short enough to prevent the securing protrusions from abutting against the top of the associated third leg member, there is no possibility of the securing protrusion abutting against the top of the third leg member. Therefore, the invention is capable of improving the telescopic extension ratio of the tripod and ensures the tripod to be sufficiently compact when carried and have an appropriate height when in use.

According to yet another feature of the present invention, each third leg member has cutout catching members which are fixed on the outer circumferential surface of the upper end portion of the third leg member so as to prevent unintentional displacement of the third leg member, each cutout catching member having a cutout recess which is formed in the cutout catching member so as to receive therein the securing protrusion of the corresponding catching member of the second leg member when the distance by which the third leg member projects from the second leg member is at its minimum extension. As the securing protrusions of the catching members of each second leg member are respectively inserted in the cutout recesses of the catching members of the associated third leg member when the distance by which the third leg member projects from the second leg member is at its minimum extent, there is no possibility of the securing protrusion abutting against the top of the third leg member. As a result of this feature, the telescopic extension ratio of the tripod can reliably be improved.

A tripod according to yet another feature of the present invention includes a base; first leg members rotatably attached to said base, each first leg member having a brake insertion hole formed near the bottom thereof; second leg members respectively inserted in said first leg members so that the distance by which each second leg member projects from the associated first leg member can be adjusted; receiving members respectively fixed in the bottoms of said first leg base members; catching members fixed on the outer circumferential surface of the upper end portion of each second leg member and adapted to catch the corresponding receiving member when the second leg member is projected from the associated first leg member to the fullest extent; operation lever supporting members respectively fixed on the outer circumferential faces of the lower end portions of said first leg members; operation levers respectively supported by said operation lever supporting members; and brakes respectively inserted in said brake insertion holes so that by operating the associated operation lever in the state where its second leg member projects from the first leg member to the fullest extent, each brake is pushed against a portion of the outer surface of the second leg member which is located above the bottom of the catching members of the second leg member, thereby securing the second leg member to the associated first leg member. With the configuration as above, operation of an operation lever causes the brake disposed in the first leg member associated with said operation lever to be pushed against a portion of the outer surface of the associated second leg member which is located above the bottom of the catching members of the second leg member, thereby fixing the second leg member to the associated first leg member. Because of this feature, the invention is capable of reducing the length of the portion where each first leg member overlaps the second leg member when in use and, consequently, improving the telescopic extension ratio of the tripod and ensures the tripod to be sufficiently compact when carried and have an appropriate height when in use.

BRIEF DESCRIPTION OF THE DRAWINGS

FIGS. 6(*a*) and (*b*) are front views of another embodiment of a tripod according to the present invention;

FIG. 6(*c*) is a front view of a conventional tripod;

PREFERRED EMBODIMENT OF THE INVENTION

Next, the structure of an embodiment of a tripod according to the present invention is explained hereunder, referring to FIGS. 1 through 5.

A tripod shown in FIGS. 1 through 5 has a leg structure comprising extensible legs, each of which consists of a plural number of segments, e.g. three segments. An elevator rod 22 passes through the base 21 in such a way that the height of the elevator rod 22 can be adjusted. A panhead (not shown) to be used with a camera is removably mounted on the top of the elevator rod 22.

Figure 1:
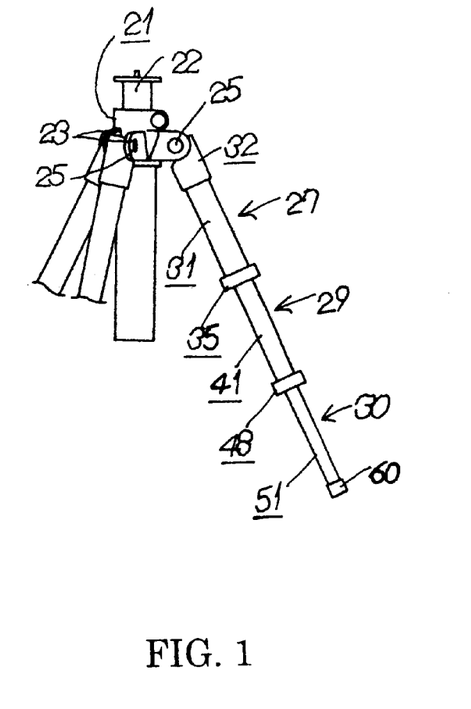
FIG. 1 is a schematic perspective of an embodiment of a tripod according to the present invention.

Three pairs of leg connecting plate portions 23, each pair of which is comprised of two leg connecting plate portions 23 that are spaced apart and situated facing each other, protrude from the base 21. A fitting hole 25 is formed near the protruding end of each leg connecting plate portion 23.

A pair of rotary shaft portions 28 on the upper end portion of each first leg member 27, which has a long, narrow, tubular shape, are rotatably fitted in each respective pair of fitting holes 25 of the base 21. A second leg member 29 having a long, narrow, tubular shape is inserted in each first leg member 27 in such a way that the distance by which the second leg member 29 projects from the first leg member 27 can be adjusted, and a third leg member 30 having a long, narrow, tubular shape is inserted in each second leg member 29 in such a way that the distance by which the third leg member 30 projects from the second leg member 29 can be adjusted.

As shown in FIGS. 1 through 5, each first leg member 27 has a first leg base member 31 which is made of aluminum and has a long, narrow, thin-walled tubular shape having a circular or polygonal cross section.

Figure 3:
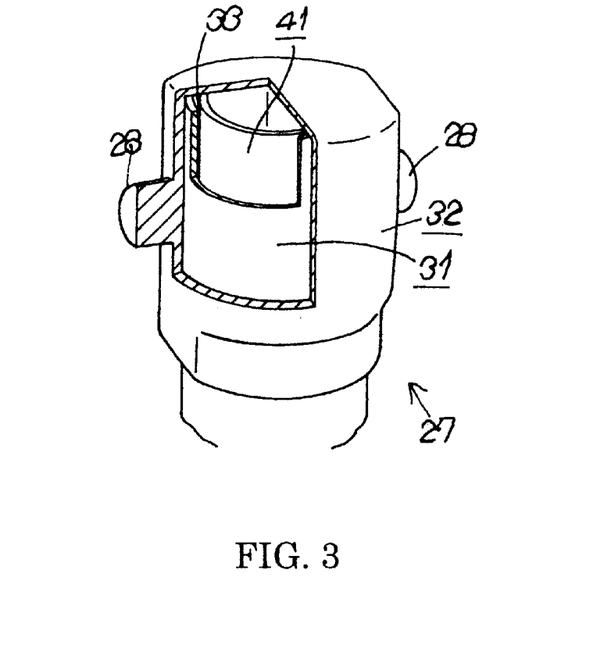
FIG. 3 is a perspective of the upper end portion of a first leg member of said tripod.

A cap-like leg rib 32 is fixed around the outer cylindrical surface of the top of the first leg base member 31 so that a top opening 33 of the first leg base member 31 is closed off by the leg rib 32. The aforementioned pair of rotary shaft portions 28 are integrally formed on the outer surface of the cylindrical wall of the leg rib 32 so that the two rotary shaft portions 28 are coaxially positioned and extend sideways in opposite directions. Each rotary shaft portion 28 has a diameter slightly smaller than the inner diameter of each fitting hole 25 mentioned above and is fitted in each respective fitting hole 25.

An operation lever supporting member 35 in the shape of a tube which is open at the top and the bottom is attached to the outer cylindrical surface of the lower end portion of the first leg base member 31 so that a cam-type operation lever 36 is rotatably supported by the operation lever supporting member 35. A brake housing section 37 is formed in the operation lever supporting member 35.

Figure 5:
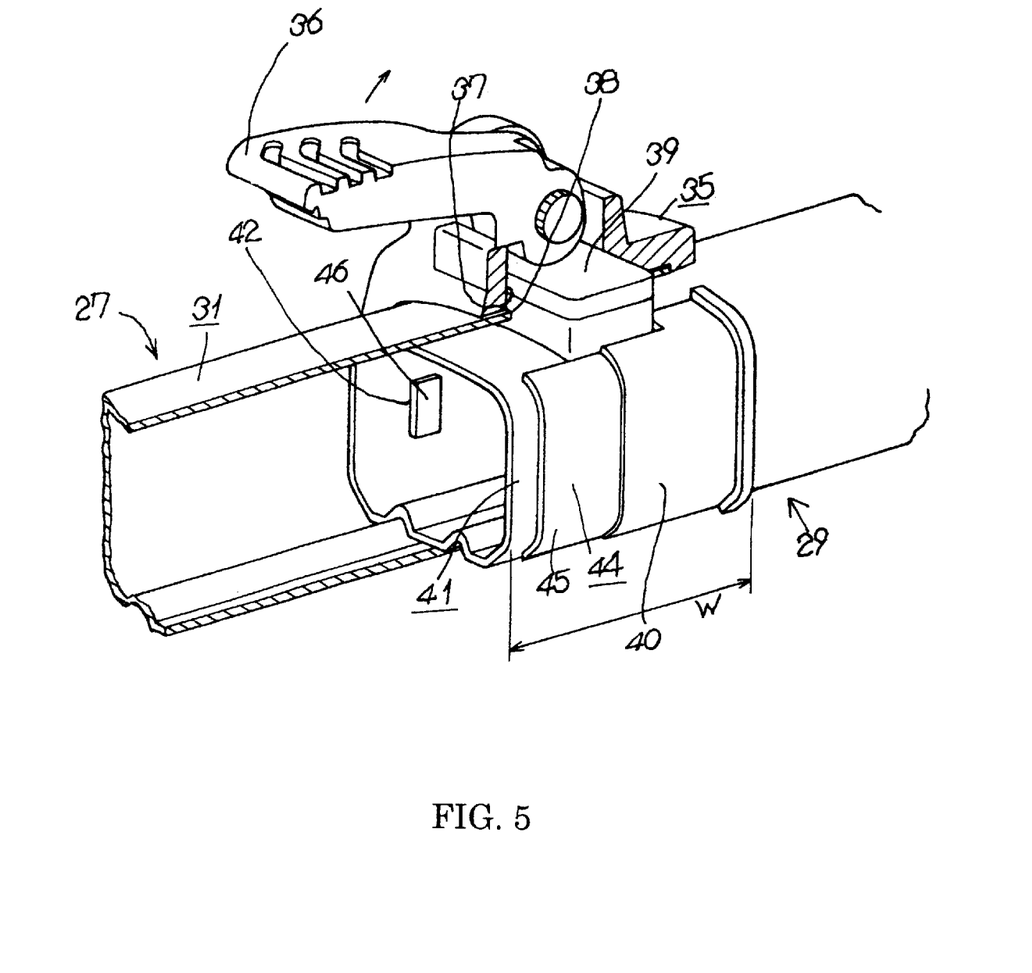
FIG. 5 is a perspective of the leg portion of said tripod when in use.

A brake insertion hole 38 is formed near the bottom of the first leg base member 31, at a location facing the brake housing section 37. A brake 39 in the shape of a rectangular parallelopiped is inserted through said brake insertion hole 38. In the state where the brake 39 is inserted through the brake insertion hole 38, the outer facing portion of the brake 39 is inside the brake housing section 37. In this state, when the outer facing portion of the brake 39 in the brake housing section 37 is pushed by the aforementioned operation lever 36, the inner facing portion of the brake 39 is pressed against a given location on the outer surface of the second leg member 29.

A first receiving member 40 having a thin-walled tubular shape and serves as a receiving member is fixed in the bottom of the first leg base member 31. The first receiving member 40 functions to prevent rub, rattling or other undesirable manner of contact between the first leg base member 31 and the second leg base member 41 described below, thereby enabling the smooth adjustment of the distance by which the second leg member 29 projects from the first leg member 27.

Each one of the second leg members 29 described above has a second leg base member 41 which is made of aluminum and has a long, narrow, thin-walled tubular shape having a circular or polygonal cross section and a diameter smaller than that of the first leg base member 31 explained above. Each second leg base member 41 is provided, near the top thereof, with a given number of penetration holes 42 located apart from one another. In case of the present embodiment, two penetration holes 42 are provided opposite each other.

A given number of catching members 44 (for example, two catching members 44) for preventing unintentional displacement of the second leg member 29 are fixed to the upper end portion of the second leg base member 41, at locations opposite each other. Each catching member 44 has an acting base portion 45 in the shape of a thin, rectangular plate having a curvature corresponding to the outer shape of the second leg base member 41. A securing protrusion 46 in the shape of a rectangular parallelopiped is formed at the center of the inner surface of each acting base portion 45 and protrudes inward.

The securing protrusion 46 of each catching member 44 is snugly inserted in the corresponding penetration hole 42 so that these securing protrusions 46 fitted in the penetration holes 42 secure the aforementioned acting base portions 45 to the outer cylindrical surface of the upper end portion of the second leg base member 41. In the state where the second leg member 29 projects from the first leg member 27 to the fullest extent, the bottom rim of the acting base portion 45 of each catching member 44 abuts against and is thus engaged with the upper rim of the aforementioned first receiving member 40 as shown in FIG. 5, thereby preventing the second leg member 29 from unintentionally slipping off of the first leg member 27.

In the same manner as in case of the first leg base member 31 described above, a second receiving member (not shown) which has a thin-walled tubular shape and serves as a receiving member is fixed in the bottom of the second leg base member 41. The second receiving member functions to prevent rub, rattling or other undesirable manner of contact between the second leg base member 41 and the third leg base member 51 described below, thereby enabling the smooth adjustment of the distance by which the third leg member 30 projects from the second leg member 29.

In the same manner as in case of the first leg base member 31 described above, an operation lever supporting member 48 in the shape of a tube open at the top and the bottom is fixed to the outer cylindrical surface of the lower end portion of the second leg base member 41 so that a cam-type operation lever (not shown) is rotatably supported by the operation lever supporting member 48. A brake housing section (not shown) is formed in the operation lever supporting member 48. Furthermore, in the same manner as in case of the first leg base member 31 described above, a brake insertion hole (not shown) is formed near the bottom of the second leg base member 41, at a location facing said brake housing section. A brake (not shown) which is in the shape of a rectangular parallelopiped is inserted through said brake insertion hole. In the state where the brake is inserted through the brake insertion hole, the outer facing portion of the brake is inside the brake housing section. In this state, when the outer facing portion of the brake in the brake housing section is pushed by the aforementioned operation lever, the inner facing portion of the brake is pressed against a given location on the outer surface of the third leg member 30.

Each one of the third leg members 30 described above has a third leg base member 51 which is made of aluminum and has a long, narrow, thin-walled tubular shape having a circular or polygonal cross section and a diameter smaller than that of the second leg base member 41 explained above. Each third leg base member 51 is provided, near the top thereof, with a given number of penetration holes 52 located apart from one another. In case of the present embodiment, two penetration holes 52 are provided opposite each other.

A given number of cutout catching members 54 (for example, two cutout catching members 54) for preventing unintentional displacement of the third leg member 30 are fixed to the upper end portion of the third leg base member 51, at locations opposite each other. Each cutout catching member 54 has an acting base portion 55 in the shape of a thin, rectangular plate having a curvature corresponding to the outer shape of the third leg base member 51. A securing protrusion 56 in the shape of a rectangular parallelopiped is formed at the center of the inner surface of each acting base portion 55 and protrudes inward.

The securing protrusion 56 of each cutout catching member 54 is snugly inserted in the corresponding penetration hole 52 so that these securing protrusions 56 fitted in the penetration holes 52 secure the aforementioned acting base portions 55 onto the outer cylindrical surface of the upper end of the third leg base member 51. In the state where the third leg member 30 projects from the second leg member 29 to the fullest extent, the bottom rim of the acting base portion 55 of each cutout catching member 54 abuts against and is thus engaged with the upper rim of the aforementioned second receiving member, thereby preventing the third leg member 30 from unintentionally slipping off of the second leg member 29.

A cutout recess 58 is formed at the middle of the length of the upper end portion of the acting base portion 55 of each cutout catching member 54 so that the securing protrusion 46 of the corresponding catching member 44 of the second leg member 29 enters said cutout recess 58 when the distance by which the third leg member 30 projects from the second leg member 29 is at its minimum extension. In other words, the protruding distance of the securing protrusions 46 of the catching members 44 fixed to the upper end portion of the second leg base member 41 is such that there is no possibility of the securing protrusions 46 abutting against the top of the third leg base member 51 of the third leg member 30.

A rubber cap 60 serving as a shoe spike is fixed around the outer surface of the bottom of each third leg base member 51.

Next, the function of the embodiment described above is explained hereunder.

When carrying the tripod, after the second leg members 29 are adjusted to project from the respective first leg members 27 by the minimum distance, the second leg members 29 are respectively secured to the first leg members 27 by means of the brakes 39. After the third leg members 30 are adjusted to project from the respective first leg members 27 by the minimum distance, the third leg members 30 are secured to the first leg members 27 by means of the respective brakes.

Figure 2:
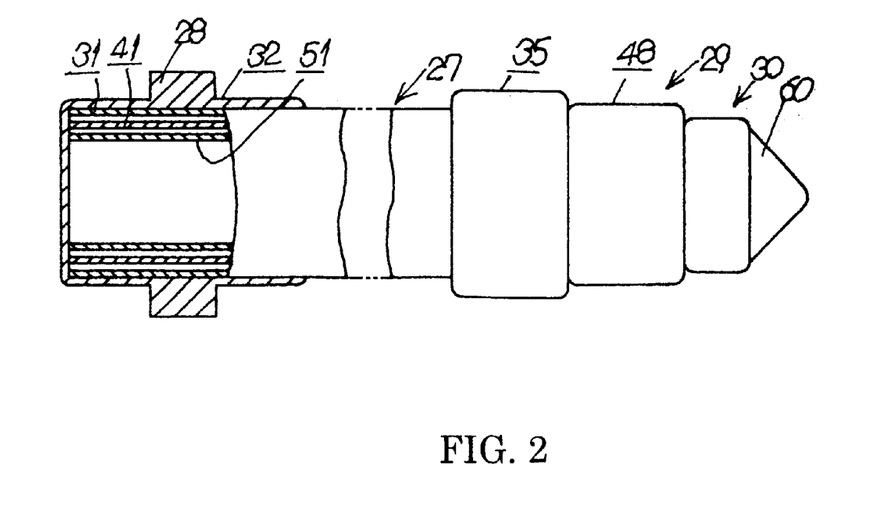
FIG. 2 is a partially omitted front view of a leg portion of said tripod.

In the state where the respective projecting distances of each second leg member 29 and third leg member 30 are set at the minimum lengths, the respective top end faces of the first through third leg base members 31,41,51 are in contact with the leg rib 32 and approximately flush with one another as shown in FIG. 2 so that the full length of the tripod is reduced to its minimum length.

Figure 4:
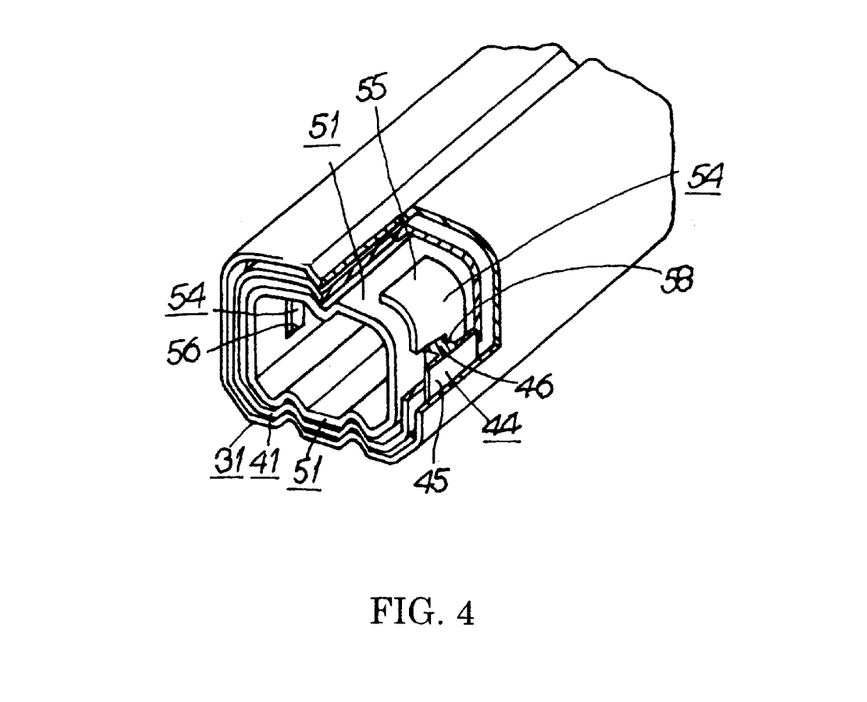
FIG. 4 is a perspective of the leg portion of said tripod when it is carried.

In the state where the respective projecting distances of each second leg member 29 and third leg member 30 are set at minimum lengths, the catching members 44 of each second leg member 29 are respectively engaged with the cutout catching members 54 of the corresponding third leg member 30, with the securing protrusions 46 of the catching members 44 inserted in the cutout recesses 58 of the cutout catching members 54 as shown in FIG. 4.

When using the tripod in the state where, for example, the tripod is extended to the fullest extent, the second leg members 29 are arranged to project from their respective first leg members 27 to the fullest extent by pulling the second leg base members 41 from their respectively associated first leg base members 31, and, thereafter, the second leg members 29 are secured to the first leg members 27 by means of the respective brakes 39.

After the third leg members 30 are arranged to project from their respective second leg members 29 to the fullest extent by pulling the third leg base members 51 from their respective second leg base members 41, the third leg members 30 are secured to the second leg members 29 by means of the brakes.

In the state where each second leg member 29 and each third leg member 30 are extended to the fullest extent, the approximate upper half of each brake 39 that is positioned near the bottom of the associated first leg member 27 is located between the two catching members 44 and pushed against a given location on the outer surface of the second leg member 29 in such a manner as shown in FIG. 5 so as to cover the part of the second leg member 29 which is located above the bottom of the catching members 44 of the second leg member 29. With the operation lever 36 holding the brake 39 at the pushed state, the second leg member 29 is secured to the first leg member 27. Although it is not shown in the drawings, an approximate upper half of the brake positioned near the bottom of each second leg member 29 is located between the two cutout catching members 54 and pushed against a given location on the outer surface of the third leg member 30 in such a manner as to cover the part of the third leg member 30 which is located above the bottom of the cutout catching members 54 of the third leg member 30. With the operation lever holding the brake at the pushed state, the third leg member 30 is secured to the second leg member 29.

As a result, in the state where total length of the tripod is at the maximum length, the length W of the portion where each first leg member 27 overlaps the second leg member 29 and the length W of the portion where each second leg member 29 overlaps the third leg member 30 are both shorter than the length C of the portion where each first leg member 3 overlaps the second leg member 6 of a conventional tripod.

As described above, the embodiment described above is capable of improving the telescopic extension ratio of a tripod and, therefore, ensures the tripod to be sufficiently compact when carried and have an appropriate height when in use.

To be more specific, a pair of coaxially extending rotary shaft portions 28 are formed on the outer surface of the upper end portion of each first leg member 27 as an integral body therewith, and the securing protrusions 46 of the catching members 44 of each second leg member 29 are formed such that the protruding distance of the securing protrusions 46 is short enough to prevent the securing protrusions 46 from abutting against the top of the third leg member 30. With the structure as above, as the respective top end faces of each set of the first through third leg base members 31,41,51 are in contact with the leg rib 32 and approximately flush with one another when the tripod is in the fully contracted state, the embodiment is capable of improving the telescopic extension ratio and ensures the tripod to be sufficiently compact when carried and have an appropriate height when in use.

Furthermore, the approximate upper half of the brake 39 near the bottom of each first leg member 27 and the approximate upper half of the brake disposed near the bottom of each second leg member 29 are respectively pushed against the outer surfaces of the corresponding second leg member 29 and third leg member 30, i.e. a location above the bottom of the catching members 44 and a location above the bottom of the cutout catching members 54 as a result of operation of the respective operation levers (the operation lever 36 and the one not shown in the drawings). Thus, the second leg member 29 and the third leg member 30 are secured. Therefore, in the state where the tripod is extended to its maximum length, the length W of the portion where each first leg member 27 overlaps the second leg member 29 and the length W of the portion where each second leg member 29 overlaps the third leg member 30 can be made shorter than that of a conventional tripod. Because of this feature, the embodiment is capable of improving the telescopic extension ratio and ensures the tripod to be sufficiently compact when carried and have an appropriate height when in use.

Although the tripod of the embodiment explained above has a leg structure comprising extensible legs, each of which consists of three segments comprising a first leg member 27, a second leg member 29 and a third leg member 30, the invention is applicable to an extensible leg structure consisting of two, four or more segments.

Figure 6:
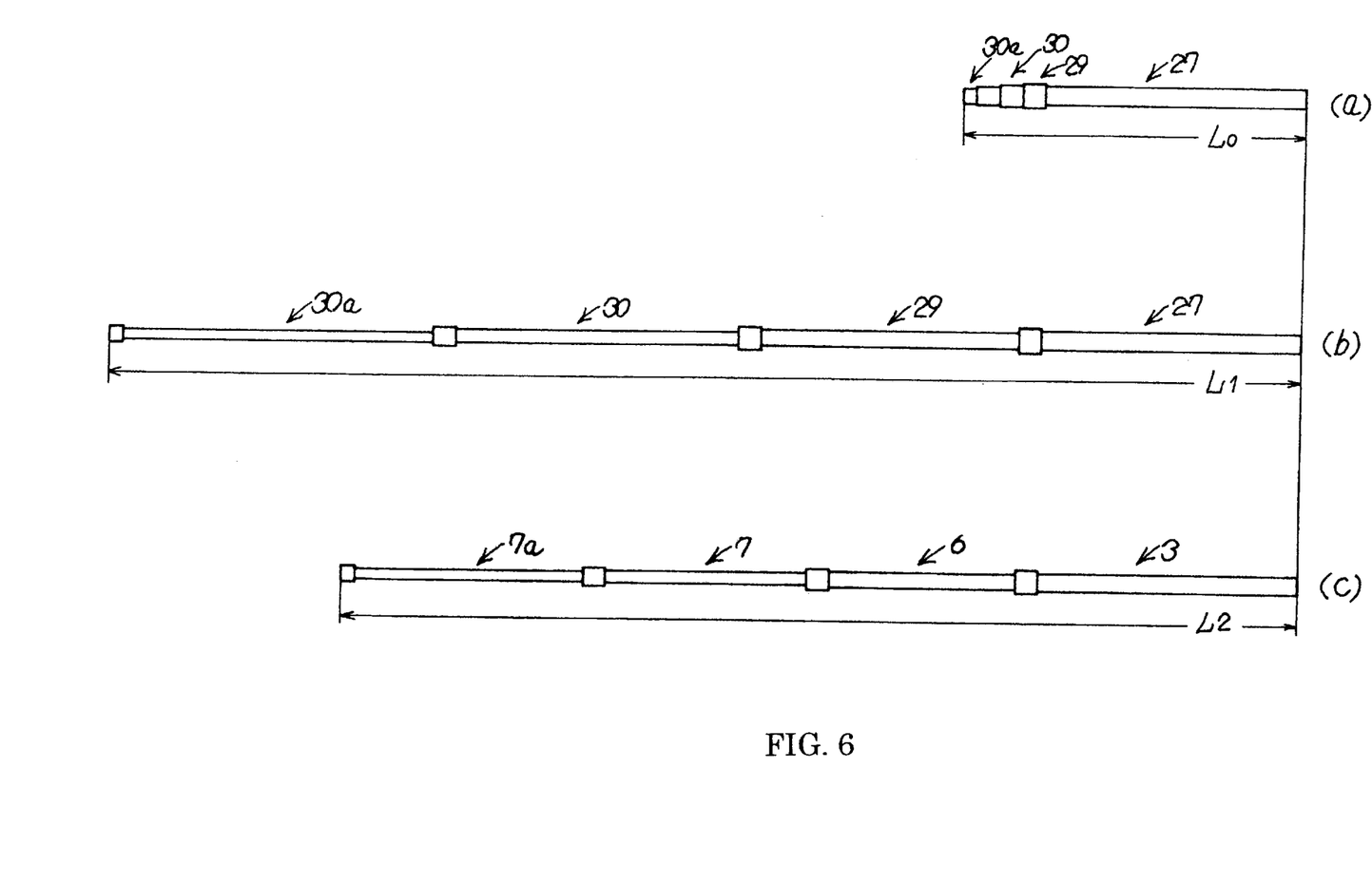
Figure 7:
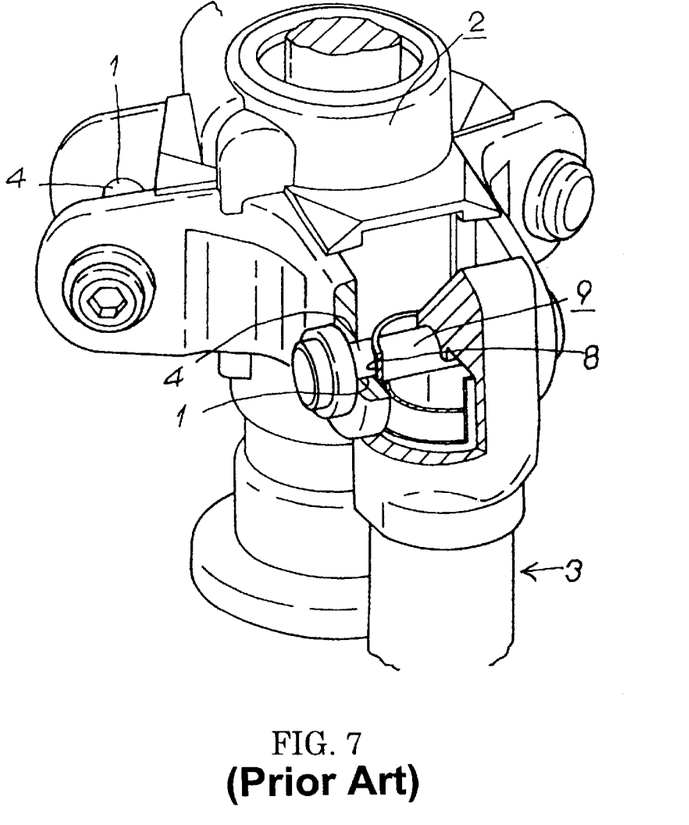
FIG. 7 is a perspective of said conventional tripod.

For example, the tripod shown in FIGS. 6(a) and (b) has a structure applied to an extensible leg structure consisting of four segments. The tripod according to this embodiment is similar to the tripod shown in FIG. 1, except that a fourth leg member 30a having a long, narrow, tubular shape is inserted in each third leg member 30 in such a way that the distance by which the fourth leg member 30a projects from the third leg member 30 can be adjusted so that the bottommost segment of each leg is formed by the fourth leg member 30a instead of the third leg member 30.

When the tripod whose minimum length is represented by L0 in FIG. 6(a) is fully extended when in use, the total length of the tripod becomes the maximum length L1 as shown in FIG. 6(b). However, even if a conventional tripod having the same minimum length L0 is fully extended when in use, its total length can be increased only to the maximum length L2 shown in FIG. 6(c). A tripod according to the present embodiment thus has a telescopic extension ratio (L1/L0) considerably greater than that of the conventional tripod. Furthermore, the conventional tripod shown in FIG. 6(c) is similar to the conventional tripod shown in FIGS. 7 through 10, except that a fourth leg member 7a having a long, narrow, tubular shape is inserted in each third leg member 7 in such a way that the distance by which the fourth leg member 7a projects from the third leg member 7 can be adjusted so that the bottommost segment of each leg is formed by the fourth leg member 7a instead of the third leg member 7.

POSSIBLE INDUSTRIAL APPLICATION

As described above, a tripod according to the invention may be used as, for example, a portable tripod having a leg structure comprising extensible legs, each of which consists of three segments.

What is claimed is:

1. A tripod including:

a base having pairs of fitting holes, two each of which are spaced apart and situated facing each other so as to constitute a pair;

first leg members, each of which has a pair of coaxially extending rotary shaft portions that are integrally formed on the outer circumferential surface of the upper end portion of the first leg member and rotatably fitted in the corresponding pair of fitting holes; and second leg members respectively inserted in said first leg members so that the distance by which each second leg member projects from the associated first leg member can be adjusted and that the upper end portion of each second leg member is positioned between the rotary shaft portions of the first leg members, with the top end face of each second leg member flush with the top end face of the associated first leg member when the distance by which the second leg member projects from the first leg member is at its minimum extension.

2. A tripod including:

a base;

first leg members rotatably attached to said base;

second leg members respectively inserted in said first leg members so that the distance by which each second leg member projects from the associated first leg member can be adjusted, each second leg member having penetration holes formed near the top of the second leg member;

third leg members respectively inserted in said second leg members so that the distance by which each third leg member projects from the associated second leg member can be adjusted;

receiving members respectively fixed in the bottoms of said first leg base members; and catching members disposed on the outer circumferential surface of the upper end portion of each second leg member, each catching member having:

an acting base portion adapted to catch the corresponding receiving member when the second leg member is projected from the associated first leg member to the fullest extent, and a securing protrusion which is formed on the inner surface of the acting base portion and fitted in the corresponding penetration hole so as to protrude from the inner surface of the acting base by a distance such that there is no possibility of the securing protrusion abutting against the top of the third leg member that is inserted in the second leg member.

3. The tripod as claimed in claim 2, wherein:

each third leg member has cutout catching members which are fixed on the outer circumferential surface of the upper end portion of the third leg member so as to prevent unintentional displacement of the third leg member; and each cutout catching member has a cutout recess which is formed in the cutout catching member so as to receive therein the securing protrusion of the corresponding catching member of the second leg member when the distance by which the third leg member projects from the second leg member is at its minimum extension.

4. A tripod including:

a base;

first leg members rotatably attached to said base, each first leg member having a brake insertion hole formed near the bottom thereof;

second leg members respectively inserted in said first leg members so that the distance by which each second leg member projects from the associated first leg member can be adjusted;

receiving members respectively fixed in the bottoms of said first leg base members;

catching members fixed on the outer circumferential surface of the upper end portion of each second leg member and adapted to catch the corresponding receiving member when the second leg member is projected from the associated first leg member to the fullest extent;

operation lever supporting members respectively fixed on the outer circumferential faces of the lower end portions of said first leg members;

operation levers respectively supported by said operation lever supporting members; and brakes respectively inserted in said brake insertion holes so that by operating the associated operation lever in the state where its second leg member projects from the first leg member to the fullest extent, each brake is pushed against a portion of the outer surface of the second leg member which is located above the bottom of the catching members of the second leg member, thereby securing the second leg member to the associated first leg member.

* * * * *

UNITED STATES PATENT AND TRADEMARK OFFICE
CERTIFICATE OF CORRECTION

PATENT NO.     : 6,536,723 B1
DATED          : March 25, 2003
INVENTOR(S)    : Koichiro Nakatani It is certified that error appears in the above-identified patent and that said Letters Patent is hereby corrected as shown below:

<u>Title page,</u>
Item [73], Assignee, delete "Nihon Nelbon Seiki Kogyo Kabushiki Kaisha" and substitute with -- Nihon Velbon Seiki Kogyo Kabushiki Kaisha --.

Signed and Sealed this

Twenty-ninth Day of July, 2003

JAMES E. ROGAN
*Director of the United States Patent and Trademark Office*